United States Patent
Roosli (10) Patent No.: US 8,536,792 B1
(45) Date of Patent: Sep. 17, 2013

(54) SYSTEM AND METHOD FOR DISTRIBUTED LIGHTING DEVICE CONTROL

(71) Applicant: Honeywell International Inc., Morristown, NJ (US)

(72) Inventor: Philipp Roosli, Niantic, CT (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/655,230

(22) Filed: Oct. 18, 2012

Related U.S. Application Data (63) Continuation of application No. 13/428,043, filed on Mar. 23, 2012, now Pat. No. 8,368,310.

(51) Int. Cl.
*H05B 37/02* (2006.01)
*H05B 41/36* (2006.01)

(52) U.S. Cl.
USPC .......................................... 315/159; 315/152

(58) Field of Classification Search
USPC ............. 315/152–154, 159, 129, 209 R, 192, 315/193
See application file for complete search history.

(56) References Cited

U.S. PATENT DOCUMENTS

| | | | |
|---|---|---|---|
| 5,754,036 A | 5/1998 | Walker | |
| 5,848,054 A | 12/1998 | Mosebrook et al. | |
| 5,905,442 A | 5/1999 | Mosebrook et al. | |
| 5,982,103 A | 11/1999 | Mosebrook et al. | |
| 6,545,434 B2 | 4/2003 | Sembhi et al. | |
| 6,687,487 B1 | 2/2004 | Mosebrook et al. | |
| 6,794,830 B2 | 9/2004 | Lansing et al. | |
| 6,803,728 B2 | 10/2004 | Balasubramaniam et al. | |
| 7,061,393 B2 | 6/2006 | Buckingham et al. | |
| 7,126,291 B2 | 10/2006 | Kruse et al. | |
| 7,353,071 B2 * | 4/2008 | Blackwell et al. | 700/23 |
| 7,498,952 B2 | 3/2009 | Newman, Jr. | |
| 7,925,384 B2 | 4/2011 | Huizenga et al. | |
| 7,936,281 B2 | 5/2011 | Cash et al. | |
| 8,035,320 B2 * | 10/2011 | Sibert | 315/312 |
| 8,159,156 B2 | 4/2012 | Henig et al. | |
| 8,197,093 B2 | 6/2012 | Veskovic | |
| 8,228,163 B2 | 7/2012 | Cash et al. | |
| 8,243,278 B2 * | 8/2012 | Valois | 356/448 |
| 8,264,172 B2 * | 9/2012 | Valois et al. | 315/312 |
| 2009/0206983 A1 | 8/2009 | Knode et al. | |
| 2011/0029139 A1 | 2/2011 | Altonen et al. | |
| 2012/0013257 A1 | 1/2012 | Sibert | |
| 2012/0025717 A1 * | 2/2012 | Klusmann et al. | 315/152 |
| 2012/0068608 A1 * | 3/2012 | Covaro et al. | 315/151 |
| 2012/0078547 A1 | 3/2012 | Murdoch | |
| 2012/0095601 A1 | 4/2012 | Abraham et al. | |

* cited by examiner

*Primary Examiner* — Minh D A
(74) *Attorney, Agent, or Firm* — Seager Tufte & Wickhem LLC.

(57) ABSTRACT

A system for distributed light control, including a light circuit, a first device associated with the light circuit, a second device associated with the light circuit, a network communicatively connecting the light circuit, the first device, and the second device, where the first device is configured to actuate the light circuit based upon a control command sent on the network and in accordance with configuration data stored at the first device, where the second device includes a shadow configuration comprising a copy of the configuration data, where the second device is configured to generate a shadow image of the light circuit based upon the control command and the shadow configuration, and where the shadow image comprises a computed status of the light circuit.

20 Claims, 8 Drawing Sheets

| Attribute | Value |
|---|---|
| Scene #0 | 30% |
| Scene #1 | 100% |
| Scene #2 | n/a |
| Scene #3 | 90% |
| : | : |
| Scene #14 | 75% |
| Scene #15 | n/a |
| Welcome Setting | Scene #1 when person enters |
| Energy Conservation | Turn off when space is vacant |
| Logical Light Circuit #0 | 24 |
| Logical Light Circuit #1 | 17 |
| Logical Light Circuit #2 | n/a |
| Logical Light Circuit #3 | n/a |
| Ramping Speed | 4000 milli seconds |
| Multi-Cast Memebership | 1,4,5,6 |

SYSTEM AND METHOD FOR DISTRIBUTED LIGHTING DEVICE CONTROL

This application is a continuation of U.S. patent application Ser. No. 13/428,043, filed Mar. 23, 2012 now U.S. Pat. No. 8,368,310, which is incorporated herein by reference.

BACKGROUND OF THE INVENTION

The subject matter disclosed herein relates to device control systems and, more particularly, to an improved system and a method for distributed lighting control.

Traditional light control systems used in buildings are built with load actuators, such as relays and dimmers circuits and user interfaces such as keypads and sliders. Higher level appliances, such as PCs and tablets, can be used for visualizing the state of the lights and for allowing another means to control the light settings. In distributed light control systems, these elements are connected with each other through a network. These systems are built on a distributed architecture where user interfaces and load assemblies can be distributed throughout a space. Unlike a centralized controller, this distributed architecture avoids the need that all light loads and user interfaces be hardwired to the centralized controller thereby saving the cost of having to pull all load carrying cables to the controller and if wireless networks connect the devices, further saving the cost to pull the networking cables between the devices. Another advantage of a distributed architecture is that there is more flexibility during the project installation and post-installation to make changes to the system as these systems are less dependent on the said cables.

Such systems are built with a large number of different devices built to be interoperable with each other, meaning that they can communicate with each other via a network. If such devices are capable to directly communicate with each other via a common network protocol, they are generally perceived to form a product family.

The network protocol for traditional lighting solutions contains two categories of network commands. The first category are the control commands, such as toggling of a light circuit, setting an absolute setting such as OFF, ON or a dim setting or requesting a light scene that is addressing a group of light actuators. A second category of commands addresses the need to send the current status of the light actuator back to the user interfaces. This second command type is used so that, for example, the user interfaces can indicate the brightness of the light with an LED light bar or with a fill-bar on an LCD of a PC or tablet. This feature can be achieved by requiring the user interfaces to poll the load actuating devices for the current state of the load. Another method is where the load actuating device sends the device status to the user interfaces on its own without requiring to be polled.

The limitation of this second type of command lies in the difficulty in scalability to larger automation solutions. If a user interface launches a control command to N load actuators which in turn need to report their actuator settings to M different user interfaces, an N×M scaling relationship results where, if not properly designed, the network traffic will be very substantial and would lead to systems with high latencies. Even if a broadcasting or multicasting method is used to send the controlling command, many actuators will need to update all the user interfaces with their new state at once, thus the multitude of actuator status information will burden the network. Accordingly, a new and improved distributed lighting architecture is required.

BRIEF DESCRIPTION OF THE INVENTION

A system for distributed light control is provided, the system including a light circuit, a first device associated with the light circuit, a second device associated with the light circuit, a network communicatively connecting the light circuit, the first device, and the second device, where the first device is configured to actuate the light circuit based upon a control command sent on the network and in accordance with configuration data stored at the first device, where the second device includes a shadow configuration comprising a copy of the configuration data, where the second device is configured to generate a shadow image of the light circuit based upon the control command and the shadow configuration, and where the shadow image comprises a computed status of the light circuit.

A method is provided for controlling a plurality of distributed lighting devices disposed in communication on a network, the method including storing configuration data at a load actuating device configured to operate a light circuit, obtaining a copy of the configuration data through the network and storing the copy as a shadow configuration at a shadowing device, transmitting a control command on the network, receiving the control command at the load actuating device and operating the light circuit based upon the control command and the configuration data, and receiving the control command at the shadowing device and generating a shadow image of the light circuit based upon the control command and the shadow configuration, where the shadow image comprises a computed status of the light circuit.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
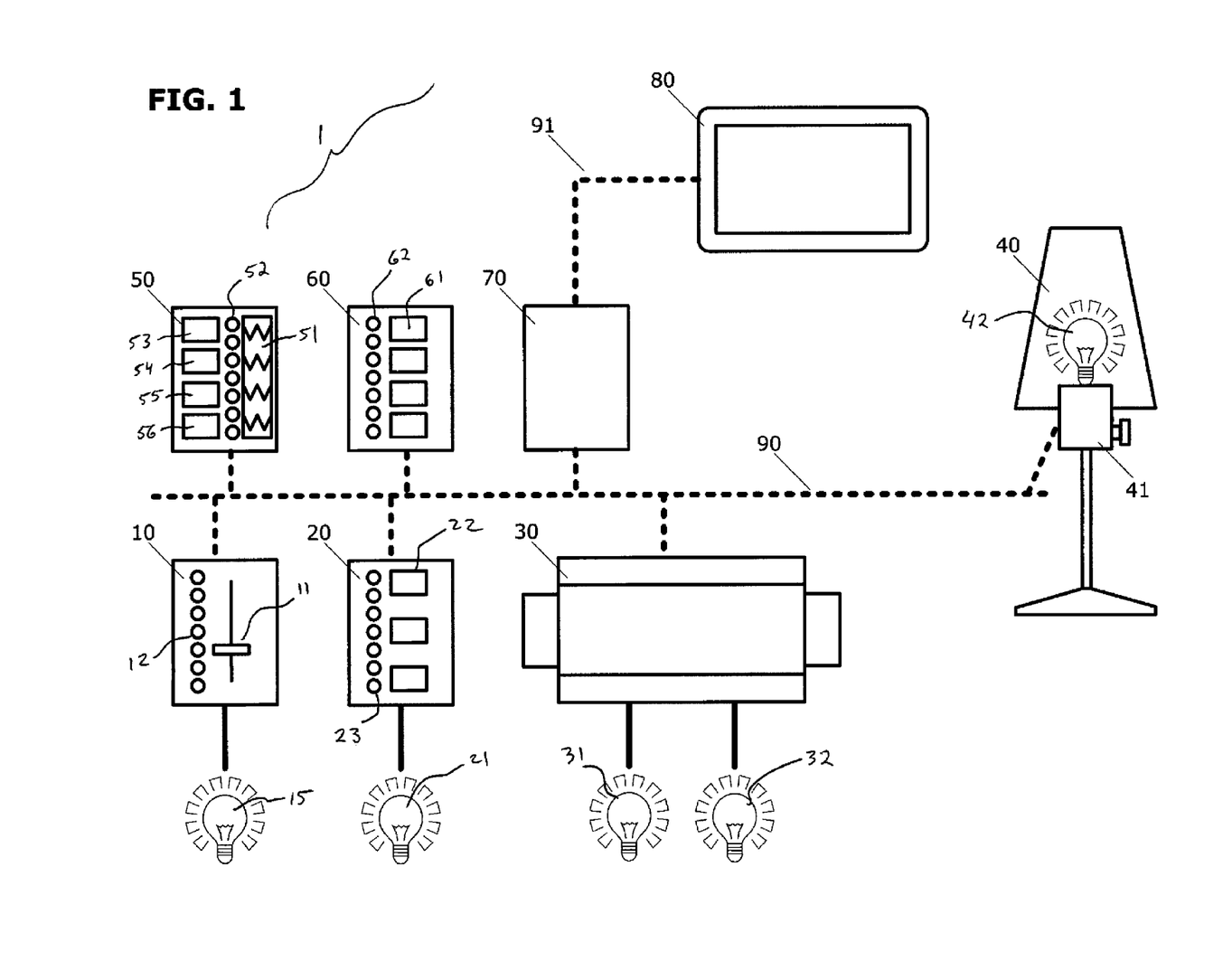
FIG. 1 is a schematic of a predictive distributed light control system in non-limiting exemplary embodiment of the invention.

FIG. 1 illustrates an exemplary embodiment of a distributed light control system 1 in accordance with the invention. The system 1 includes a first wall box device 10 and a second wall box device 20, each communicatively associated with a first light circuit 15 and a second light circuit 21, respectively. As will be discussed in more detail herein, the wall box devices 10 and 20 each include local controls in the form of, for example, a slider, buttons, capacitive touch-screen elements, etc., which are utilized to address the respective light circuits. The system 1 further includes a DIN-rail mounted dimmer 30 which is communicatively associated with two light circuits 31 and 32.

Essentially, the first wall box device 10, the second wall box device 20, and the DIN-rail mounted dimmer 30 each comprise load actuators which serve to control the state of a light load of the corresponding light circuit 15, 21, 31, and 32 or, as further discussed herein, may be used to control the light loads of other circuits throughout the system 1.

The wall box devices 10 and 20 generally comprise wall-mounted devices, such as dimmers or relay modules, which include user interfaces and allow for control of designated light circuits. The wall box device 10 includes a user interface comprising a slider control 11 and a display 12. The slider control 11 is configured to operate a dimmer circuit by which a user can manually set a variable light level of the light circuit 15, or other light circuits. The display 12 indicates the light level by, for example, a series of vertically arranged light emitting diodes (LEDs). The wall box device 20 comprises a push-button user interface comprising one or more buttons 22 and a display 23. Actuation of the buttons 22 control the light levels of the circuit 21, and/or the light levels of other circuits throughout the system 1. For example, the wall box device 20 may comprise a dimmer circuit and/or a relay circuit such that actuation of the buttons 22 can result in a dimming of a related light circuit 21 and/or the turning on/off of the circuit 21. The display 23 is similar to the display 12 and is configured to visually indicate the status of the corresponding light circuit 15 and/or to provide additional visual or audial information pertaining to the system 1.

The wall box devices 10 and 20 can be used to control the light load of the respective light circuits 15 and 21, respectively. However, in another embodiment, the wall box devices 10 and 20 can be configured such that they can control any other light circuit throughout the system 1.

The DIN-rail mounted dimmer 30 comprises a light controller without a user interface or display. The dimmer 30 is depicted in FIG. 1 as a dual-channel DIN-rail mounted dimmer but could alternatively be any type of dimmer mechanism or a relay controller or any device that controls any number of light loads. As discussed herein in further detail, the DIN-rail mounted dimmer 30 can receive light control commands from any other device that is a member of the predictive distributed light control system 1.

Returning to FIG. 1, the system 1 further includes a free-standing lamp 40 which comprises a control module 41 which is configured to control a light load of a respective light circuit 42. The control module 41 may be configured to turn the light circuit 42 on and off and/or to provide a dimming functionality to the light circuit 42. The control module 41 further includes a network transponder which enables communication with other devices within the system 1. The control module 41 can control the light circuit 42 locally, but also the control module 41 can be reconfigured to additionally and/or alternatively control any light aspect of the lighting system 1.

The system 1 further includes a first user interface 50 and a second user interface 60. These interfaces 50 and 60 are configured to control one or more of the light loads of the light circuits 15, 21, 31, 32, and 42. More specifically, the user interfaces 50 and 60 are configured to control the load actuating devices 10, 20, 30, and 40 which then in turn operate the light circuits 11, 21, 31, 32, and 42. The user interface 50 includes a slider control 51, a display 52, and buttons 53-56. The user interface 60 includes buttons 61 and a display 62. Actuation of the buttons 53-56 and 61 and the slider control 51 send control commands to one or more of the load actuating devices 10, 20, 30, and 40.

The system 1 further comprises a control network 90 which connects all of the above-discussed elements of the system 1. As shown in FIG. 1, the network 90 connects the wall box dimmers 10 and 20, the DIN-rail mounted dimmer 30, the free-standing lamp 40, and the user interfaces 50 and 60. The control network 90 provides the necessary link between the devices so as to facilitate communication with each other. The control network 90 can be of a wired nature, such as KNX or RS485/Modbus or any other proprietary technology. Alternatively, the network 90 can be wireless. If wireless, the network 90 is implemented with any applicable type of wireless technology, including Radio Frequency (RF), for example, in the form of ZigBee, other 802.15.4-based networks, Z-Wave or other RF protocols. A wireless version of the network 90 can also be implemented with infrared communication, such as INNCOM's IRS protocol. In another exemplary embodiment, the network 90 can be implemented as a hybrid network through bridging in which various wired and wireless networks are merged into a converged network.

As shown in FIG. 1, the system 1 further includes a gateway device 70 connected to the control network 90 and also connected via an external network 91 to an external device, such as a tablet 80. The gateway 70 is essentially an interface that allows external devices to interact with and participate on the control network 90. That is, the gateway 70 provides the network protocol translations necessary to connect the external device 80 with the control network 90. The gateway 70 maintains a link to the external device 80 via the external network 91. Typical external networks could be in the form of WiFi (802.11), wired Ethernet (802.3) or IPv6 networks based on 6LoWPAN that utilizes the 802.15.4 protocol definition, or the external network may be a wired network like those discussed above regarding the control network 90.

In FIG. 1, the gateway device 70 is depicted by way of example as a dedicated device. It is assumed that the functionality of the gateway 70 can be integrated into any other device that is part of the system 1. The gateway device can, for example, be part of the DIN-rail dimmer 30 or the wall box dimmer 10, etc. Further, other devices in proximity to the system 1, such as a TV, a set-top-box or a telephone, could include the gateway module 70 integrated therein. The advantage of this integration is one of a shared power supply, enclosure and connectivity to the network 91.

Any of the user interfaces 50, 60, the gateway device 70, and the external tablet device 80 can be used in the system 1 to control multiple light circuits. The controlling of multiple lights at once is herein referred to as controlling a "light scene" or a "light mood". The user interfaces 50, 60, the gateway device 70, and the external tablet device 80 can be mounted at separate locations, allowing the respective light circuits 11, 21, 31, 32, 42 to be controlled from various locations throughout the particular room or building in which the system 1 is disposed.

Figure 2:
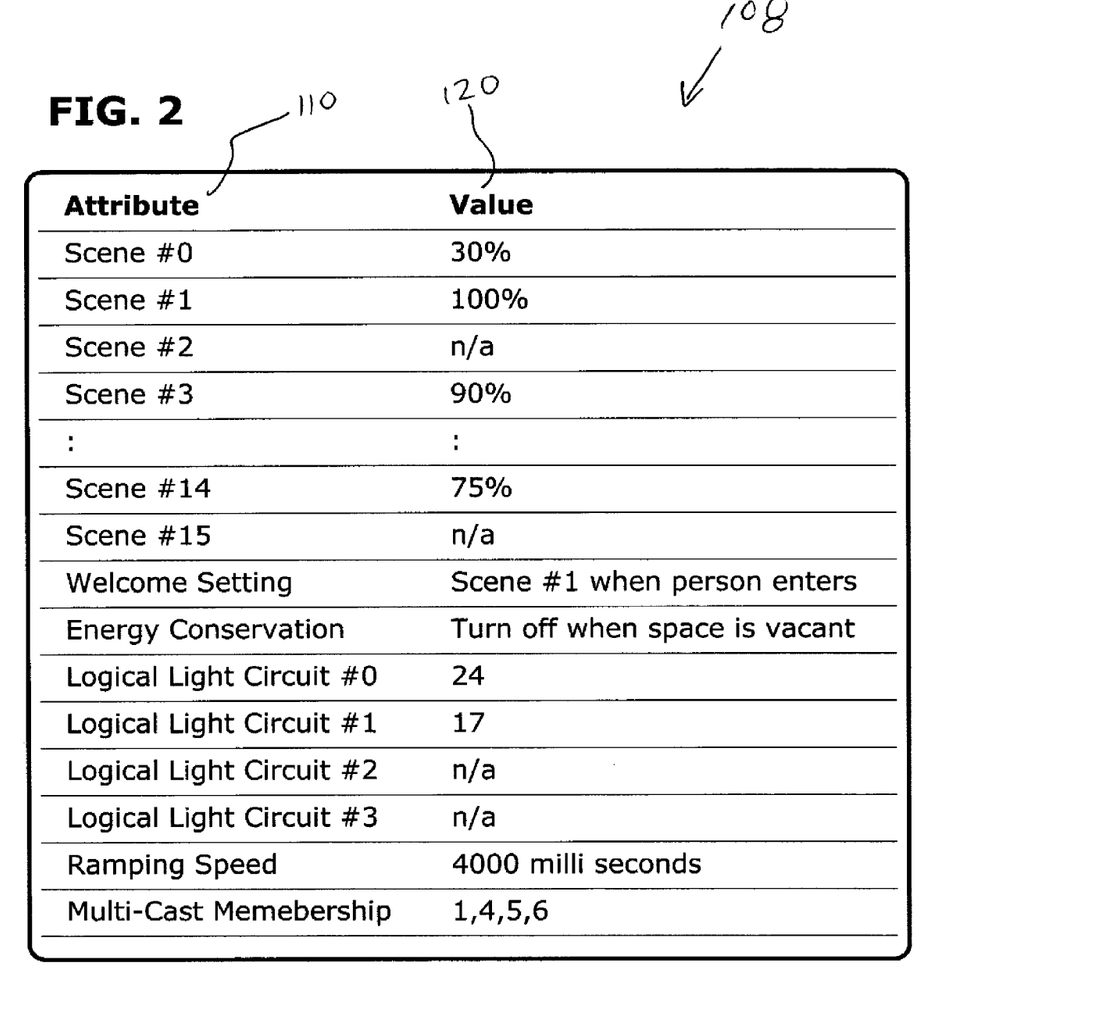
FIG. 2 shows a configuration table that defines properties of a light circuit of FIG. 1.

Turning to FIG. 2, an exemplary configuration table 108 is illustrated. Fundamentally, the configuration table 108 is a record in table format that contains all pertinent control information of a single light circuit. The table 108 as shown in FIG. 2 includes attributes 110 and values 120. The attributes 110 comprise scenes and different settings applicable to the corresponding light circuit, while the values 120 provide discrete definitions and limitations of the attributes 120. The configuration table 108 can be stored in one or more the load actuating devices 10, 20, 30, 41 of FIG. 1 and/or in the user interfaces 50, 60 and/or in the tablet device 80. The configuration table 108 is typically stored in non-volatile memory in one or more of these devices. Exemplary memory used in this respect comprises NVRAM memory or FLASH memory, both of which can retain values of the configuration table 108 even if the respective device loses power for a time period or if the device is reset. The values of the configuration table could be stored in a binary data record or in a more verbose XML format within the device. Regardless of the type of memory implemented, the particular device 10, 20, 30, 40, 50, 60, 70, 80 has free access to the values of the configuration table.

An illustrative example of the use of the configuration table 108 will now be discussed. Assuming that the table 108 is stored in a device D and that the device D receives a command to engage "light scene #3", the device D would then look-up the corresponding value in the configuration table 108. As shown in FIG. 2, this value is "90%" indicating that a respective light circuit should be set to 90% brightness. Then, the device D receives a command to set the light circuit to "scene #2". Again, the device D looks for this value in the configuration table 108 and determines that the respective light circuit is not part of that scene. Thus, the brightness level is maintained at the 90% as previously established. The device D then receives a command for "multi-cast address 5" to dim down the light circuit. With reference to the table 108, the device D determines that the respective light circuit is indeed a part of multi-cast address 5. Accordingly, the device D drives the output of the light circuit downward with a speed that is defined, for example, in the field "Ramping Speed" of the table 108. This field defines how long it takes to adjust the brightness of the light circuit from an OFF to a fully ON setting and vice versa. This example of usage of the configuration table 108 is of course merely illustrative. The table 108 can include any of a plurality of attributes and corresponding values as required by the particular specifications of the predictive distributed lighting system 1.

The configuration table 108 includes attributes 110 entitled, logical light circuits. These are essentially another form of multi-casting. The logical light circuits allow for the grouping of multiple light circuits in different devices together to form a joined group. For example, a logical light circuit may include all light circuits that illuminate a certain area such as a living room, that serve a particular purpose such as plant lights, or that have a shared security aspect such as lights that should be turned on in an emergency. More generally, a logical light circuit includes lights that should be controlled together in order to arrive at a desired outcome. The combinations are infinite as long as the system provides enough entries for logical light circuits, multi-cast address memberships, and scene entries.

In another example of the usage of the configuration table 108, a building automation system might transmit particular events into the system 1 which, based upon specific attributes 110 programmed into the configuration table 108, would result in specific light settings. For example, the building automation system may detect that a previously unoccupied space has become occupied and transmit this event to the system 1 which would then send a "welcome" command to the various devices of the system 1. Light circuits that possess an attribute and a value in their configuration table which corresponds to the welcome command would then be appropriately activated to create a welcome light scene. Alternatively, if the building automation system detects that a previously occupied space becomes unoccupied, the building automation system may communicate this event to the system 1 which would then in turn issue an "unoccupied" command. Devices receptive to this command would then actuate their light circuits according, for example, the light circuits would be lowered or turned off to conserve energy. Such measures could have additional attributes such as "timeouts" that govern the length of the time period before the energy conservation measures take place.

In another example, the configuration table 108 may be used to govern how the various lighting devices of the system react to a peak-demand load shedding command. For example, during peak-demand conditions, the lights could be dimmed to 75% of their original setting or the lights could be limited to a specific maximum dim setting. That is, the configuration table 108 of a light load actuating device could include an attribute relating to a peak-demand condition and a corresponding value. Then, a "peak demand load shedding" command sent on the network would be received by the device and processed in accordance with the table 108 so as to dim the respective light device during the period of peak demand.

In still another example, an attribute could govern how the system operates when environmental light levels are taken into account. In this case, a light sensor in one of the system devices measures the environmental light level, in particular the contributions from the natural light sources, such as light that enters the space through the windows. This measured light level is then broadcasted to all of the devices in the system. These devices each possess a configuration table which includes a respective environmental light attribute and a corresponding value. The devices receive the broadcast "environmental light" command and process he command in accordance with the respective attribute and value stored in their configuration table and then operate their light circuit accordingly. That is, during times when there is sufficient natural light available, based upon the attributes and values of their configuration tables, the light actuating devices might reduce or limit their light output in order to conserve energy consumption. Accordingly, adjusting the light output based upon environmental conditions is modeled via a configuration table that can be copied to multiple participants in the system. As such, every node that is interested in the state of the light loads can accurately predict these states based on the available control commands and the mentioned light sensor updates.

The configuration table as described above with respect to FIG. 2 does not represent an exhaustive explanation of all possible attributes that could be part of a light circuit configuration. While light scene settings and the introduction of logical light circuits might be considered to be important attributes, various systems and solutions might very well expand on the present concept and add additional attributes without changing the fundamental aspect of what has been presented. Because the attributes in the configuration table will likely be expanded in the future, a preferred embodiment of sending the configuration table over a network to the shadowing devices or of sending the configuration table into the load actuating device itself would be to use an extensible data structure such as XML. As in certain instances the verbosity of XML might exceed an efficient transfer of the configuration data through network 90, an equivalent binary encoding might be chosen. The extensible nature of the configuration table allows the attributes and values therein to be changed, updated, or expanded upon over time or in any desired time interval.

Figure 3:
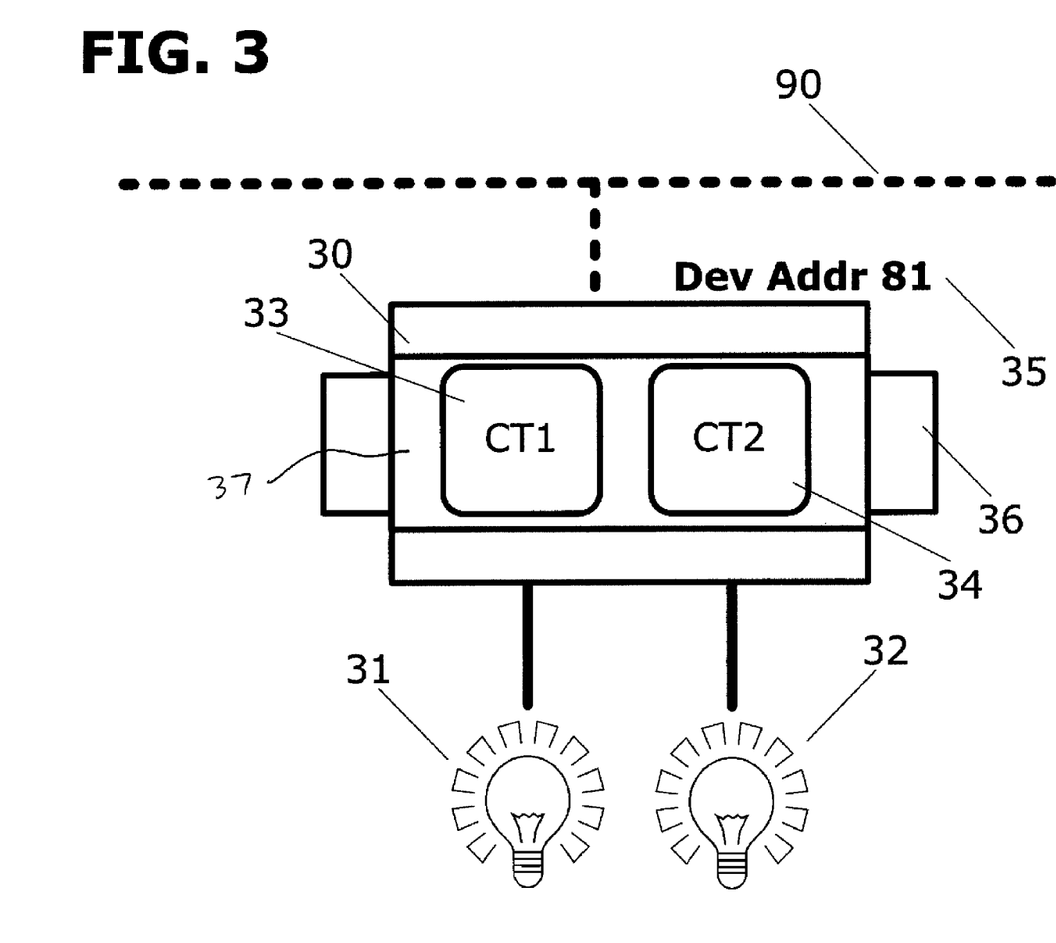
FIG. 3 shows an enlarged view of a device of the system of FIG. 1.

FIG. 3 illustrates an enlarged view of the DIN-rail mounted dimmer 30 introduced above with respect to FIG. 1. The dimmer 30 is disposed on a rail 36 and is designated within the distributed lighting control system 1 by an address 35. As discussed previously, the dimmer 30 is connected to light circuits 31 and 32 which comprise any of a variety of light loads including incandescent light bulbs, halogen light bulbs, compact or regular fluorescent light bulbs, LED light bulbs, or any other light load that can be driven by a light actuating device.

The DIN-rail mounted dimmer 30 is an electronic device built with a microcontroller and memory 37. The memory 37 contains the software that operates the dimmer 30. A portion of the memory 37, or alternatively an additional memory component, is used to store a first configuration table 33, associated with the first light circuit 31, and a second configuration table 34 which is associated with the second light circuit 32. The configuration tables 33, 34 are of the exemplary configuration described with respect to table 108 of FIG. 2. That is, the configuration tables 33, 34 include the attributes listed in table 108, but may include different values. The dimmer 30 operates the light circuits 31, 32 with a dimming circuit based on, for example, a Triac or FET configuration. Alternatively, the dimmer 30 could provide an analog output in the form of a 0-10VDC output to operate a power stage (not shown) that provides the actual dimming operation. Alternatively, the dimmer 30 could simply be a relay controller where dimming values are not applicable but where the light load still can be controlled with an OFF and ON position. The DIN-rail dimmer 30 is configured to receive control signals from the network 90 and to correspondingly control the light circuits 31 and 32, individually or together, based upon attributes and values in the respective first and second configuration tables 33 and 34. The device address 35 of the dimmer 30 renders the dimmer 30 unique within the system 1 and makes the dimmer 30 addressable on the control network 90. In the illustrated example, the device address 35 is, "81".

Figure 4:
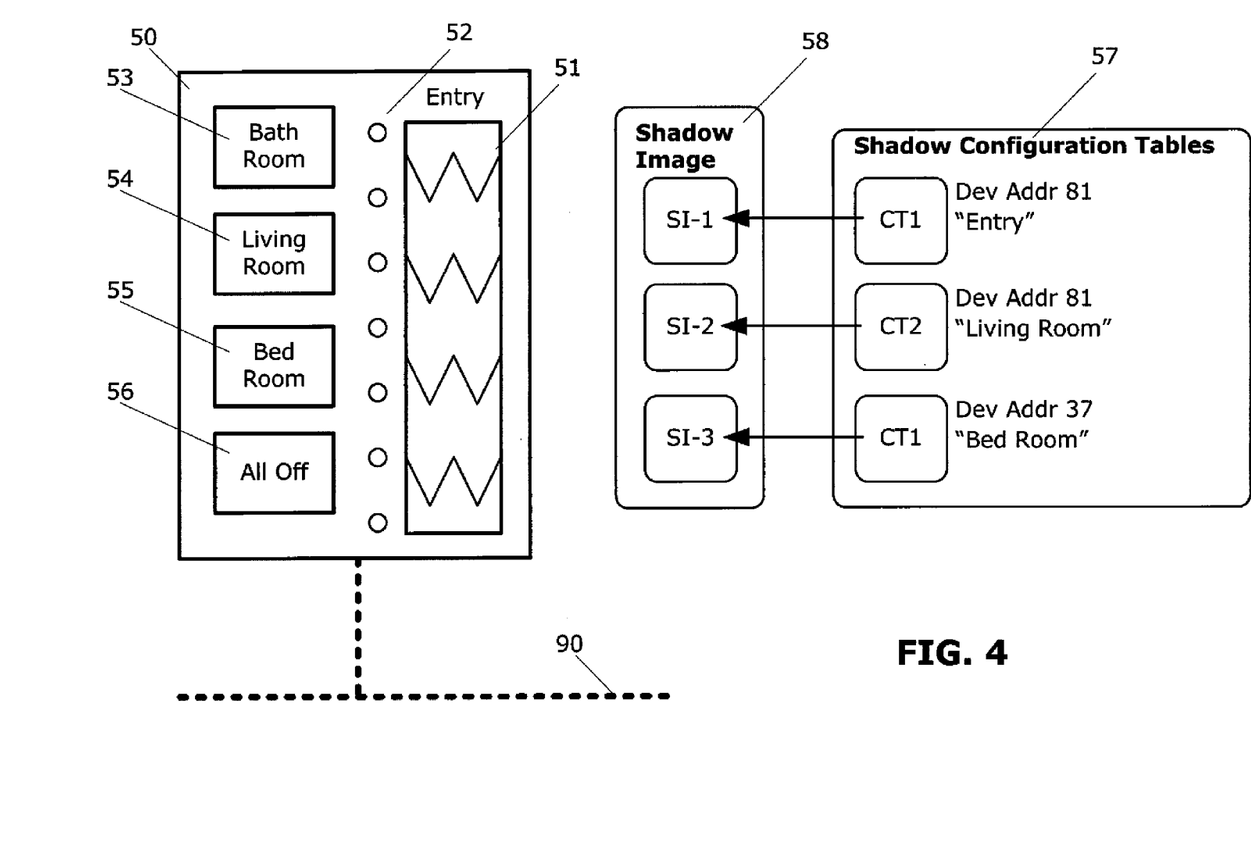
FIG. 4 shows an enlarged view of another device of the system of FIG. 1.

FIG. 4 is an enlarged view of the user interface 50 of the distributed lighting system 1. As discussed above, the user interface 50 includes the slider control 51, the display 52, and buttons 53-56. The slider control 51 is used, in this example, for dimming an entry light circuit. That is, actuation of the slider control 51 results in the user interface 50 sending a dim command on the network 90 the load control device associated with the entry light. The slider control 51 may be implemented using an electro-mechanical arrangement with a potentiometer or a capacitive touch sensor antenna. The dimming level provided by the slider control 51 is indicated on the display 52 which may comprise a plurality of LEDs. The buttons 53-56 of the user interface 52 may comprise electromechanical keys such as dome keys. Alternatively, these buttons 53-56 may comprise capacitive touch sensors. By actuating these buttons, a user sends command controls on the network 90 to various light circuit load control devices.

The user interface 50 is powered via a connection to a line power or via a low voltage source (not shown). As previously discussed, the user interface 50 is further connected to the control network 90. As mentioned, this connection allows the interface 50 to transmit control commands and to receive commands that pertain to specific light circuits that are being monitored and controlled. To that extent, the user interface 50 is configured with one or more shadow configuration tables 57. In general, a shadow configuration table is a copy of a configuration table of specific a load actuating device. In the provided example, the user interface 50 includes three shadow configuration tables 57: one corresponding to the first configuration table 33 of actuating device 30 discussed above with regard to FIG. 3; a second corresponding to the second configuration table 34 of device 30 also discussed above; and a third shadow configuration table corresponding to a first light circuit of a device 37.

Having a copy of these configuration tables allows the user interface 50 to accurately monitor and simulate the execution of light control commands that target the respective light circuits. For example, if a control command is sent on the network 90 that turns on an entry light which is physically operated by the light circuit 31 and the dimmer 30 (i.e., device address 81), the user interface 50 can mimic the operation of this actuating device and compute a shadow image SI-1 of the light circuit 31. That is, the user interface 50 receives the control command from the network 90, compares this command to the shadow configuration table 57, and computes the shadow image SI-1 of the light circuit 31. The shadow image is essentially a simulation of the operation of the light circuit 31. The shadow image can indicate to the user interface 50 that the light circuit 31 has been turned on, or off, or dimmed to a certain value, etc.

For example, if a control command is sent on the network 90 by the user interface 50 or by another device and the command instructs "Device Address 81" to power on, the command is received by both the DIN-rail mounted dimmer 30 and the user interface 50 (and any other device connected by the network 90). The dimmer 30 reads the command and compares it to its configuration table CT1. Based upon this comparison, the dimmer 30 accepts the command and powers the light circuit 31 on. Simultaneously, the user interface 50 reads the command, identifies it as being directed to Device Address 81, and compares it with the relevant shadow configuration table. Based upon this comparison, the interface 50 generates the shadow image SI-1 which reflects that the light circuit 31 is now powered on. As such, the user interface 50 essentially has knowledge of the operation of the circuit 31 and may send further control commands to the circuit 31 or to other circuits based upon the operational knowledge provide by the shadow image SI-1.

As shown in FIG. 4, the generated shadow images are stored in a table 58. Processing light control commands of selected actuating devices using shadow imaging provides the user interface 50 with the necessary information to ascertain the operating activity of the related light circuits and any changes made thereto. In the example provided, the computed shadow image SI-1 that tracks the entry light state can be forwarded to the display 52 to continuously display the real-time brightness level of this circuit.

The button 53 of the user interface 50 is configured to toggle a bathroom light on and off, where the bathroom light is actuated by a load actuating device remote to the user interface 50. Assuming that there is only a single bathroom light, the user interface 50 does not require the computed operational status of the bathroom light circuit. Thus, the interface 50 does not possess a shadow configuration table nor a shadow image related to the bathroom light. Instead, the user interface 50 simply interacts with the bathroom light via transmission of a simple TOGGLE command.

In the exemplary embodiment illustrated in FIG. 4, the button 54 is related to the second light circuit 32 of the DIN-rail mounted dimmer 30 (i.e., device address 81) disposed in a living room. That is, when a user manipulates the button 54, the user interface 50 sends various commands to the dimmer 30 which then operates the light circuit 32. The user interface 50 compares these commands with a shadow configuration table 57 relating to the light circuit 32 and, based upon this comparison, computes a shadow image SI-2 of the of the circuit 32, in the manner as discussed above concerning the slider control 51. The shadow image SI-2 essentially simulates the operating status of a key light of the living room lights that serves as a guide so that when the button 54 is pressed, the user interface 50 can properly compute if the living room lights should be turned on or turned off, depending upon the operating status of the living room lights. This configuration allows for the button 54 to send a deterministic ON or OFF command into the network 90. Computing a deterministic operation is important, especially in a situation where the living room contains more than one light circuit and where these light circuits can be controlled individually and therefore could be out of synchronization with each other. If button 54 would send a simple TOGGLE command into the network, the living room lights that are on would go off and vice versa. This would lead to an undesirable effect that would result in confusion and uncertainty to the user. By referring to the shadow image SI-2, the user interface 50 is aware of the computed operating condition of the related light circuit and is thus capable of transmitting an accurate, deterministic command.

In similar fashion, the button 55 is disposed in communication with a light actuating device having a network address 37 located in a bedroom. The button 55 is linked to the shadow image SI-3 of the table 58 which simulates the operating status of the respective bed room light circuit. This simulation results from the user interface 50 receiving control commands directed to the device address 37 and applying these commands to the configuration table CT1 so as to compute the shadow image SI-3. As such, the button 55 essentially has knowledge of the operational status of the related bed room light circuit and can tailor its commands accordingly.

As discussed above, the user interface 50 is configured such that the buttons 53-56 and the slider control 51 are configured to perform a specific function that might optionally be based on one or multiple shadow images. Acquisition and storage of the shadow configuration tables and creation of the necessary shadow images occurs, for example, by one of two methods. The first of these configuration methods is to program the user interface 50 with a shadow configuration table that contains the device addresses and circuit indexes that need to be monitored. In the example of FIG. 4, this would be device 81—circuit 1, device 81—circuit 2 and device 37—circuit 1. When the user interface 50 starts, it could simply ask the referenced devices for their configuration tables and then copy them over the network 90 into a volatile memory, such as RAM, of the user interface 50. Alternatively, the shadow configuration tables could be stored in non-volatile memory within the user interface 50 which would not require the stated copy operation when the user interface 50 starts up. In this second configuration method, the copy operation would typically have to be initiated by a person who installs and commissions the network 90, for example by a handheld programming device which is temporarily connected to the user interface 50 for downloading the respective configuration table(s). Alternatively, the configuration tables could be injected from commissioning tools or from a central building automation server.

Figure 5:
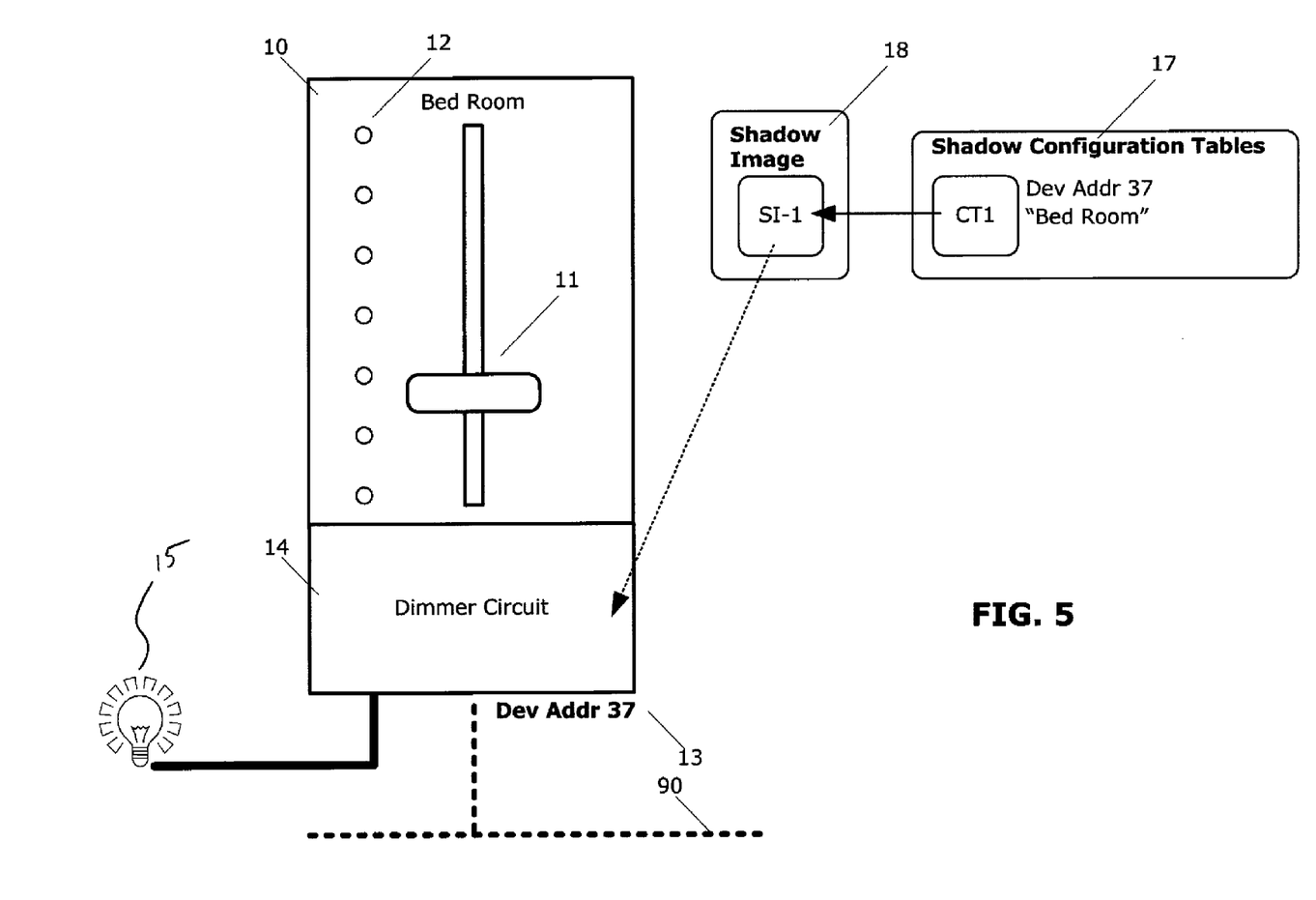
FIG. 5 shows an enlarged view of another device of the system of FIG. 1.

FIG. 5 shows an enlarged and expanded view of the wall box dimmer 10 introduced above with respect to FIG. 1. As discussed previously, the wall box dimmer 10 is connected to the control network 90, includes a slider control 11 and a display 12, and is configured to operate the light circuit 15. The slider control 11 could be based on an electromechanical input device or based upon a capacitive touch sensor antenna. In one exemplary embodiment, the display 12 is implemented with LEDs. The wall box dimmer 10 also contains a dimmer circuit 14 which drives the dimming of the light circuit 15. The dimmer circuit 14 is can be built, for example, with Triac or FET circuitry.

When the user operates slide control 11, the wall box dimmer 10 will send a dim level set command with a slider-corresponding brightness level into the control network 90. The command packets are sent to the address of the dimmer itself, i.e., "Device Address 37". The protocol stack is implemented in such a way that if a packet is transmitted to the address of the device itself, it will not only transmit it into the network, it also will loop it back into the protocol stack as if the packet would just have been received from the network. Doing both allows other devices to track the brightness level of the light circuit 15 as operated by the wall box dimmer 10, but at the same time allows the slider 11 of dimmer 10 to operate the dimmer circuitry 14.

The wall box dimmer 10 maintains shadow configuration tables and shadow images similarly to the user interface 50 shown in FIG. 4. But instead of computing the state of an external light circuit, as performed by the interface 50, the dimmer 10 stores a shadow configuration table 17 and generates a shadow image 18 to reflect the operation of the dimmer circuit 14 and of the corresponding light circuit 15. This is made possible by looping of command packets, as described above. This simple implementation forwards the computed brightness setting from the shadow image 18 directly to the dimmer circuit driver 14, as can be seen schematically in FIG. 5.

In one embodiment, this concept can easily be expanded to separate the user interface devices and the dimmer devices of the system into separately operated entities. For example, the slider 11 and display 12 of the wall box dimmer 10 could be used to operate a remote light circuit while the local light circuit 15 could be controlled from a remote user interface, perhaps by the interface 50 shown in FIG. 4. Connecting dimmer circuit 14 to a shadow image of an external light circuit allows the dimmer to further be used as a slave circuit to an external master circuit.

Figure 6:
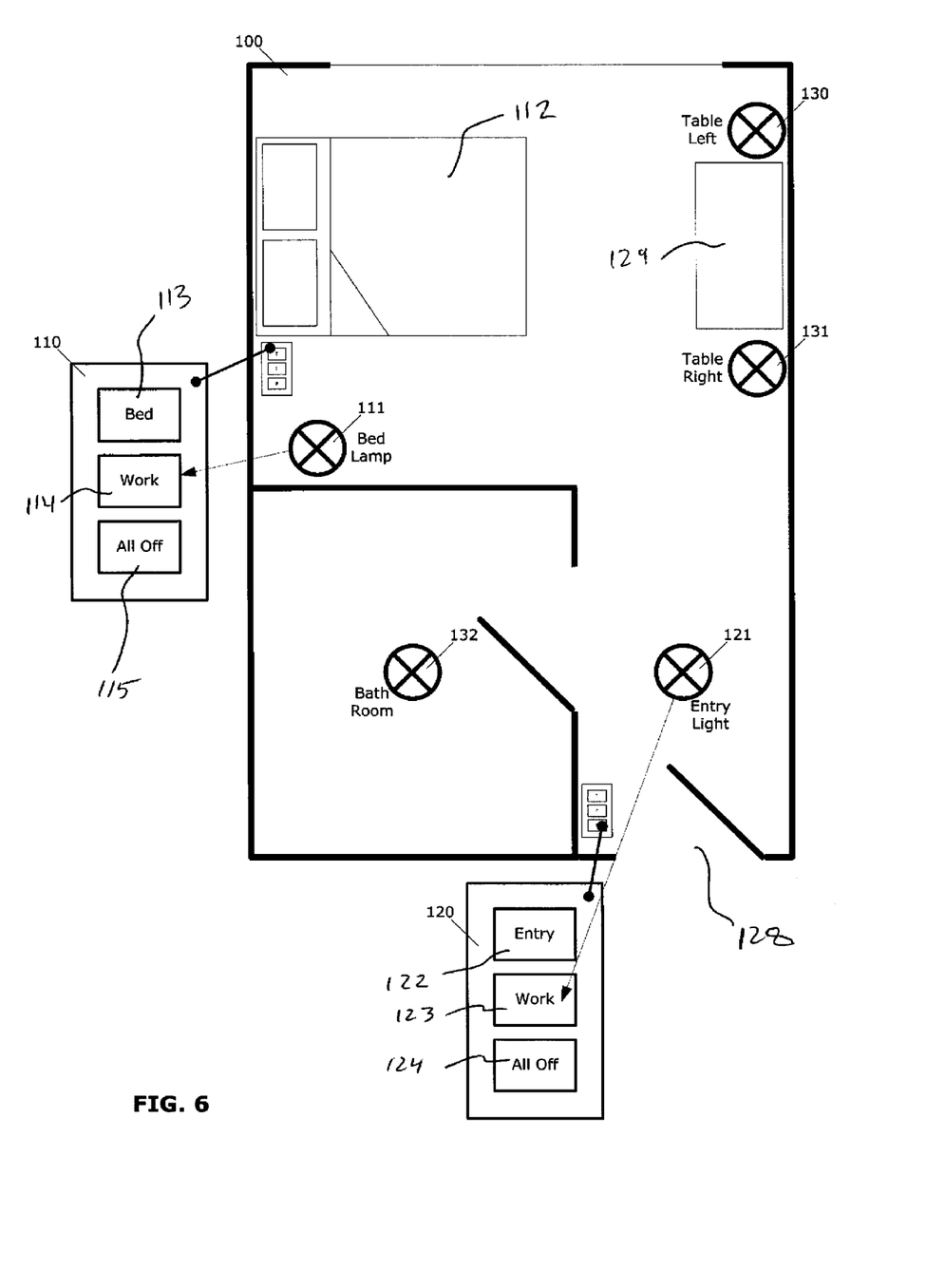
FIG. 6 shows a room of a building which includes an embodiment of the system of FIG. 1.

FIG. 6 illustrates an exemplary room 100 of a multi-room building, such as a hotel, condominium, or apartment, etc. The room 100 includes an implementation of the distributed lighting control system 1 including a switch plate 110 and a corresponding bed lamp 111, both disposed adjacent to a bed 112. The room 100 further includes a switch plate 120 and a corresponding entry light 121, both disposed in proximity to an entrance 128 of the room 100. The room 100 also includes a console 129 having two table lights 130 and 131, and a bathroom having a bathroom light 132. The switch plates 110 and 120 and the lights 111, 121, 130, 131, and 132 are connected by the network 90 (not shown).

The switch plate 110 is configured to control the bed lamp 111 and includes buttons 113-115 labeled "Bed", "Work", and "All Off", respectively. Similarly, the switch plate 120 is configured to control the entry light 121 and includes buttons 122-124 respectively labeled "Entry", "Work", and "All Off".

The system may be configured such that actuation of either "All Off" buttons 115 or 124, results in all lights in the room 100 being turned off Actuation of the "Bed" button 113 and the "Entry" button 122 command the respective bed lamp 111 and entry light 121 to turn on and off Actuation of either "Work" button 114 or 123 turns on a number of lights in the room so that the occupant can comfortably work. For example, when a user presses either "Work" button 114, 123, the bed lamp 111 and the entry light 121 are turned on to nearly full brightness. If one of the "Work" buttons is pressed subsequently, the lights that are associated with the "Work" light scene are turned off again. Simply stated, the "Work" buttons 114, 123 toggle a light scene that includes a number of pre-selected lights, specifically the bed lamp 111 and the entry light 121.

Without the benefit of the above-discussed system and its use of shadow images and shadow configuration tables, a lighting arrangement as shown in FIG. 6 could result in confusion to the user. Suppose, for example, that a user first presses one of the "Work" buttons 114, 123 on either switch plate 110, 120. The bed lamp 111 and the entry light 121 will correspondingly be turned on. If the user then moves to switch plate 110 and presses the "Bed" button 113, then the previously selected "work scene" is destroyed or modified as the bed lamp 111 has been manually lifted from the scene setting. The result is that the bed lamp 111 is turned off. If the user again presses the "Work" button 114 at the switch plate 110, the expectation would be that the lamp 111 would be turned on. Meanwhile, the entry light 121 would have remained on after the user pressed the "Bed" button 113. Thus, if the user pressed the "Work" button 123 at the entrance 128 instead of the "Work" button 114, the expectation then would be that the "Work" scene would be turned off. This can be confusing and contradictory to the user.

Implementing the system 1 of the invention in the room 100 alleviates the confusions and contradictions described above. In the system 1, the "Work" light scene buttons 114 and 123 of plates 110 and 120, respectively, are linked to different light circuits throughout the room in order to allow a better control decision for the selected light scene. More specifically, the switch plate 110 receives commands on the network 90 regarding the bed lamp 111 and the entry light 121 and computes corresponding shadow images and based upon a comparison of the relevant control commands and shadow configuration tables of the bed lamp 111 and entry light 121 which are stored at the switch plate 110. Similarly, the switch plate 120 stores shadow configuration tables and computes shadow images of both the entry light 121 and the bed lamp 111. That is, both of the switch plates 110 and 120 shadow the operation of the lights 111 and 121. As such, the switch plates 110 and 120 have effective knowledge of the operation of the respective light circuits and issue accurate control commands based thereupon. Accordingly, in this configuration, if one of the "Work" buttons 114, 123 is initially pressed, the bed lamp 111 and entry light 121 are correspondingly turned on. If the "Bed" button 113 is then pressed, the bed lamp 111 is turned off, while the entry light is maintained on. Subsequently pressing the "Work" button would turn the bed lamp 111 on while maintaining the entry light 121 on. If instead, the "Work" button 123 was pressed at the room entrance 128, the bed lamp 111 would be turned on while the entry light 121 would remain on. This is because the switch plates 110, 120 would query the shadow image of the lamp 111 and the entry light 121 to determine the status thereof. Then, based upon the shadow images, the switch plates 110, 120 would issue the appropriate command(s) to establish the selected light scene.

As a light scene is invoked and possibly modified from individual light control functions, the shadowing of the light state in the interested user interfaces allows for an instant awareness of the control situation without requiring the light actuators to report their current states into the network and without requiring interested devices to poll the light actuators. This reduces network traffic. Accordingly, the lighting configuration is highly scalable and a light scene may easily include many plates and many light circuits. That is, because each user interface can instantly compute the state of all tracked light circuits after a light control operation has been transmitted into the network, this approach does not suffer from any latency issues as compared with traditional methods where the light circuits need to update their new state to all the user interfaces.

Figure 7:
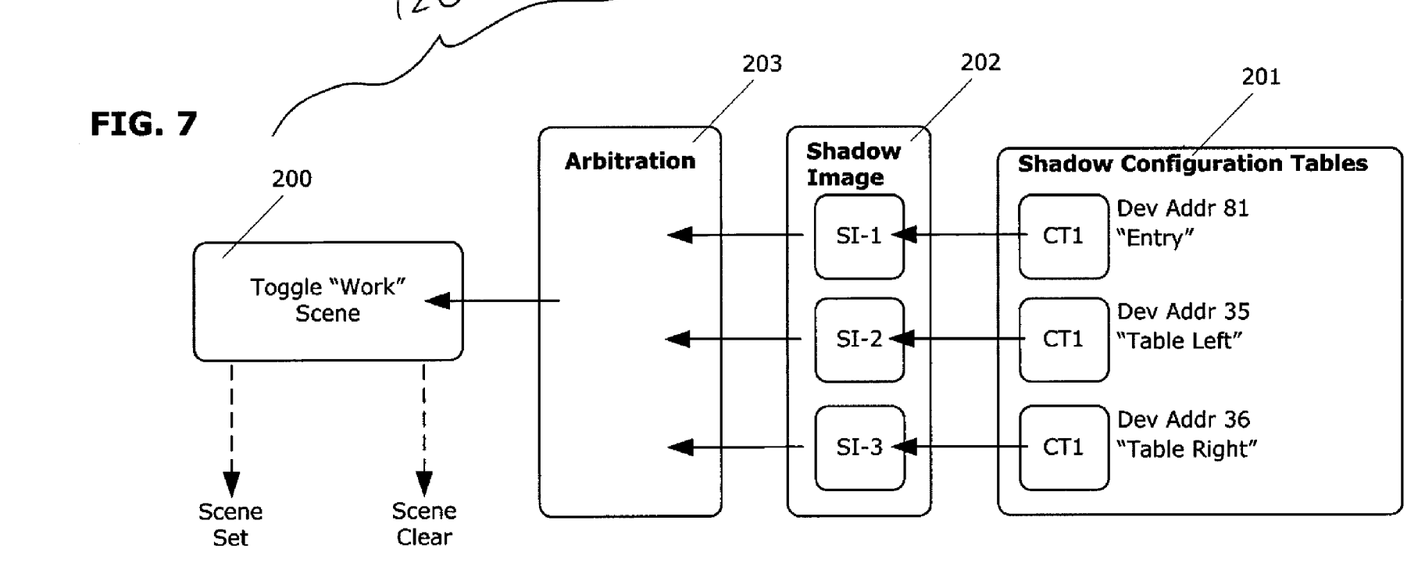
FIG. 7 shows an enlarged view of a device of the system of FIG. 6.

FIG. 7 illustrates an expanded view of the switch plate 120 disposed near the entry way 122 of the room 100. In this embodiment, the switch plate 120 is configured to control not only the entry light 121, but also the table lights 130 and 131. The switch plate 120 possesses shadow configuration tables 201 which correspond to entry light 121 and both table lights 130, 131. The switch plate 120 identifies control commands directed to the lights 121, 130, and 131 and compares these commands to the shadow configuration tables 201 and, based upon this comparison, computes corresponding shadow images 202 which essentially simulate the operation of the lights 121, 130, and 131. This "shadowing" is performed generally in the manner as discussed above. The switch plate 120, in the present embodiment, further includes an arbitration block 203 which is configured to implement an arbitration formula in order to arrive at a better and more accurate decision regarding how to toggle a partially modified light scene. In the present example, the arbitration block 203 receives light circuit levels from the shadow images 202 and is tasked to arrive at an optimal recommendation regarding whether the "Work" button 123 of the switch plate 120 should turn the lights of the lighting scene on or off The arbitration block 203 includes an appropriate arbitration formula that is configured as part of the initial configuration of the switch plate 120. For example, the arbitration block 203 may include one or more of the following formulas:

a) Turn OFF all light circuits associated with the "Work" lighting scene if any shadow image level is not off
b) Turn OFF if any shadow image level is above a specified level assigned to each light circuit.
c) Turn OFF if any shadow image level is above a certain percentage of the scene setting for the light circuit.
d) Turn OFF if the average shadow image level is above a certain brightness level.

These arbitration algorithms are, of course, merely exemplary. The invention contemplates any other arbitration which may be appropriate for a particular lighting scene. Generally, the goal of the selected arbitration algorithm is to predict what an uninitiated user would expect when a certain light control key is pressed. The more accurately the arbitration algorithm can predict what a user expects, the more natural the light control feels for the end user, thus reducing confusion and contradiction. Because the shadow images 202 are immediately available after any control command issued from any location, subsequent actuations of the "Work" button 123 can be moderated with much greater precision by the logic of the arbitration 203.

Figure 8:
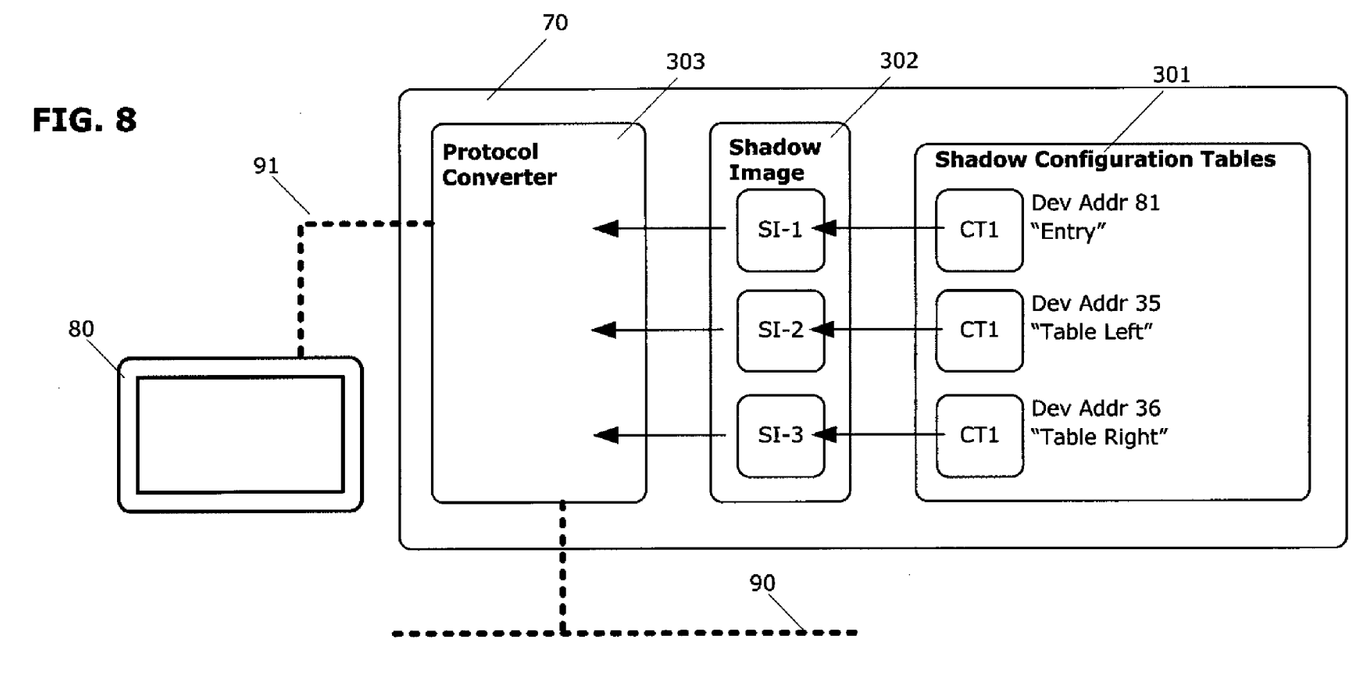
FIG. 8 shows an enlarged view of another device of the system of FIG. 6.

FIG. 8 illustrates an enlarged, expanded view of the gateway 70 introduced above with respect to FIG. 1. The gateway 70 essentially provides a bridging protocol between the control network 90 and the external network 91. The external network 91 contains products and devices that are not native participants on the controls network 90. These products include, for example, the tablet 80. The gateway device 70 shadows one, a plurality, or all of the light control circuits disposed within the control network 90. In the illustrated example, the gateway device 70 shadows the entry light 121 and the table lights 130, 131 discussed above with regard to FIGS. 6 and 7. Thus, the gateway 70 contains all of the shadow configuration tables 301 of the tracked light circuits and is capable to compute the shadow images 302 of each circuit.

As shown in FIG. 8, the gateway device 70 further includes a protocol converter 303. The protocol converter 303 essentially comprises an application by which a state of the shadow images 302 is made readily available for devices on the external network 91. Accordingly, the tablet device 80 can query the gateway device 70 for the current state of the shadowed light circuits 121, 130, 131. Changes to the shadowed images 302 can also be asynchronously reported to the external appliance 80 via the network 91.

Control commands from the tablet device 80 are forwarded via the external network 91 to the gateway device 70 where the protocol converter 303 translates the command into the particular control network protocol for the network 90. The protocol converter 303 can offer a higher-level functionality, such as a smart light scene toggle that is based on the arbitration algorithms introduced above with respect to FIG. 7.

In another embodiment of the gateway device 70, the protocol converter 303 is not directly connected to the tablet device 80 by the external network 91 as shown in FIG. 8. Instead, the protocol converter 303 may be communicatively linked to a server (not shown) which in turn offers an interface to external applications, such as the tablet device 80. This re-direction of the interface between the protocol converter 303 and the external appliance 80 through the server will ensure to a higher degree that the appliance 80 possesses the addressing information of the associated protocol converter 303. This is of particular benefit in multi-dwelling housings where there are potentially many protocol converters 70 present.

Sending absolute commands, such as "on" and "off", from an originating device to one or multiple light actuating devices makes it easy for all other devices within the system 1 to compute a shadow state for the respective light circuits. The devices simply monitor and record the absolute command, and thus the state of the light loads is well defined. A challenge arises, however, with the introduction of relative commands. For example, in an initial condition, a light load actuator is set to an 80% brightness level. All devices that track a shadow state of this device accurately reflect this initial condition. Continuing the example, a user interface device now sends a "dim-down" command to the load actuator and subsequently this user interface transmits a STOP command before the light has been fully turned off Then, a "dim-up" command is sent and again intercepted a while later by a STOP command. Repeating these steps, the user interface will ramp the light load up and down a number of times without ever going to the terminal settings. Every time such a dim ramping operation is executed, there is a small time uncertainty between the actual load actuating device and all other devices that compute a shadow image of the respective light circuit. The reason for this is that each device on the network 90 runs at a clock speed which is not calibrated with the other devices on the network 90. As such, packets which travel through the network 90 can have variable arrival times as the latency in the network depends upon the routed path the packet has travelled. A single operation would only introduce a small error between the load actuator and the devices that track the shadow state. However, if the above-described operation is repeated multiple times, this small error can accumulate and the shadow images created by the various device on the network 90 can deviate significantly from the actual load setting. Further, this scenario can introduce discrepancies and non-uniformity between the shadow images created by the various devices.

To avoid this scenario, the invention provides a "STOP-at". That is, instead of sending a plain STOP command every time the ramping operation is aborted, the transmitting device in one embodiment of the invention is configured to track the load actuator and to create its own shadow image of the respective light circuit. The transmitting device then augments the STOP command with the brightness level of this shadow image.

In the example introduced above, if the user interface instructs the load actuator to dim down, the interface would then internally track the ramping brightness level of the load actuator and create a corresponding shadow image. When the stop command is sent after a certain amount of time but before the light has fully turned off, the user interface device would, for example, send a STOP-at −20% command. In response to this "STOP-at" command, the addressed load actuator would finalize the ramping operation at 20%. If the load actuator was still above 20%, the dim level will continue to be lowered until the 20% dim level had been achieved. If the load actuator had already fallen below 20%, then the dim direction is reversed and adjusted upward to 20%. The value of the STOP-at command of course can vary as required, e.g., 20%, 10%, 30%, etc. The STOP-at command removes the small control error discussed above and thus allows all devices that track the shadow image a particular load actuator to be in full synchronization.

The system for predictive distributed control discussed herein has been directed toward the control of light load actuator devices and related peripheral devices. The invention, however, is applicable to other devices beyond lighting devices. For example, the system may include any in-room devices the operation of which would benefit from these devices having knowledge of the status of one or more other devices in the network. Other devices that form a part of the network 1 may include media devices such as television and audio systems, window covering devices such as automated blinds and curtains, heating ventilation and air conditioning control devices, etc. These devices are essentially load actuating devices which may share a network with any combination of the above-discussed lighting devices or may comprise their own network. The non-lighting load actuating devices could be configured to be controlled by a switch plate, a user interface, and/or a gateway device. The control devices would correspondingly be configured to store shadow configuration tables and to create shadow images with regard to the particular non-lighting load actuating device(s) of interest. Furthermore, the non-lighting load actuating devices themselves may store a shadow configuration table and shadow image with respect to its own circuit, similar to the configuration of FIG. 5. Accordingly, conflicts and contradictions would be reduced where multiple user interfaces and/or switch plates controlled one or more associated non-lighting load actuating devices.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A system for distributed light control, comprising:
a first device for setting an operating state of a first light circuit;
a second device for setting an operating state of a second light circuit;
a network communicatively connecting the first device and the second device;

the first device includes a first memory for storing a first configuration dataset, wherein the first device is configured to set the operating state of the first light circuit based upon one or more control commands received via the network and in accordance with the first configuration dataset;

the second device includes a second memory for storing a second configuration dataset, wherein the second device is configured to set the operating state of the second light circuit based upon one or more control command received via the network and in accordance with the second configuration dataset;

the second device stores a first shadow configuration dataset in the second memory, wherein the first shadow configuration dataset corresponds to the first configuration dataset of the first device; and wherein the second device is configured to determine the current operating state of the first light circuit based upon the first shadow configuration dataset and one or more control commands received via the network.

2. The system of claim 1, wherein:

the first device stores a second shadow configuration dataset in the first memory, wherein the second shadow configuration dataset corresponds to the second configuration dataset of the second device; and wherein the first device is configured to determine the current operating state of the second light circuit based upon the second shadow configuration dataset and one or more control commands received via the network.

3. The system of claim 1, wherein the first device comprises a dimmer.

4. The system of claim 1, wherein the first device comprises a load actuating relay device.

5. The system of claim 1, wherein the second device is configured to obtain the first shadow configuration dataset through at least one of: the network; and a hand-held programming tool.

6. The system of claim 1, wherein the second device is configured to obtain the first shadow configuration dataset from a server connected to the network.

7. The system of claim 1, wherein the second device is configured to obtain the first shadow configuration dataset from the first device.

8. A control device for controlling an operating state of a first load, comprising:

a network interface for connecting the control device to a network;

a load interface for connecting the control device to the first load and for controlling the operating state of the first load;

a memory for storing a first configuration dataset that corresponds to the first load, and a shadow configuration dataset that corresponds to a second load;

a controller operatively coupled to the memory, the network interface and the load interface, the controller configured to set the operating state of the first load via the load interface based upon one or more control command received via the network interface and in accordance with the first configuration dataset stored in the memory; and the controller further configured to determine a current operating state of the second load based upon the shadow configuration dataset stored in the memory and one or more control commands received via the network interface.

9. The control device of claim 8, wherein at least one of the one or more control commands received via the network are intended to change the operating state of the first load.

10. The control device of claim 9, wherein at least one of the one or more control commands received via the network are intended to change the operating state of the second load.

11. The control device of claim 10, wherein the controller is configured to set the operating state of the first load based upon the at least one of the one or more control commands received via the network that are intended to change the operating state of the first load and in accordance with the first configuration dataset stored in the memory.

12. The control device of claim 11, wherein the controller is configured to determine a current operating state of the second load based upon the at least one of the one or more control commands received via the network that are intended to change the operating state of the second load in conjunction with the shadow configuration dataset stored in the memory.

13. The control device of claim 9, wherein at least one of the one or more control commands received via the network are intended to change the operating state of the first load and the second load.

14. A method for controlling an operating state of a first load and for monitoring an operating state of a second load via a load control device, comprising:

storing a first configuration dataset associated with the first load in the load control device;

storing a shadow configuration dataset associated with the second load in the load control device;

receiving a control command via a network;

selectively changing the operating state of the first load based upon the control command received via the network and the first configuration dataset; and determining a current operating state of the second load based upon the control command received via the network and the shadow configuration dataset.

15. The method of claim 14, further comprising:

receiving an input from a user via a user interface to change the operating state of the first load;

sending a control command onto the network that indicates that the operating state of the first load is to be changed.

16. The method of claim 15, wherein the load control device includes the user interface.

17. The method of claim 16, wherein the user interface is distinct from the load control device but connected to the network.

18. The method of claim 14, further comprising:

receiving an input from a user via a user interface to change the operating state of the second load;

sending a control command onto the network that indicates that the operating state of the second load is to be changed.

19. The method of claim 14, wherein the first load is a light circuit.

20. A non-transitory computer readable medium containing program instructions for controlling an operating state of a first load and for monitoring an operating state of a second load, wherein execution of the program instructions by a load control device causes the load control device, in response to receiving a control command via a network, to carry out the steps of:

selectively changing the operating state of the first load based upon the control command received via the network and a first configuration dataset associated with the first load; and determining a current operating state of the second load based upon the control command received via the network and a shadow configuration dataset associated with the second load.

* * * * *